United States Patent [19]

Gonzalez et al.

[11] 4,186,293

[45] Jan. 29, 1980

[54] CORED TYPE WELDING ELECTRODE

[75] Inventors: John Gonzalez; Ronald F. Young, both of Willoughby; Mario A. Amata, Munson Township, Geauga County, all of Ohio

[73] Assignee: The Lincoln Electric Company, Cleveland, Ohio

[21] Appl. No.: 903,852

[22] Filed: May 8, 1978

[51] Int. Cl.$^2$ ............................................. B23K 35/30
[52] U.S. Cl. ........................... 219/146.24; 219/146.3; 219/146.31; 219/146.41; 219/146.52
[58] Field of Search ........... 219/146.24, 146.3, 146.31, 219/146.41, 146.52

[56] References Cited
U.S. PATENT DOCUMENTS

| | | | |
|---|---|---|---|
| 3,531,620 | 9/1970 | Arikawa | 219/146.3 X |
| 3,566,073 | 2/1971 | Black | 219/146.52 |
| 3,702,390 | 11/1972 | Blake | 219/146.52 |
| 3,767,891 | 10/1973 | Haverstraw | 219/146.52 X |
| 3,805,016 | 4/1974 | Soejima | 219/146.3 |
| 3,825,721 | 7/1974 | Carroll | 219/146.52 |
| 3,848,109 | 11/1974 | Zvanut | 219/146.3 X |
| 3,947,655 | 3/1976 | Gonzalez | 219/146.52 |

*Primary Examiner*—Richard R. Kucia
*Attorney, Agent, or Firm*—Meyer, Tilberry & Body

[57] ABSTRACT

A cored type welding electrode which enables good penetration, has an improved range of welding voltages, produces low smoke and provides a weld deposit having good impact properties. The flux contains larger than normal quantities of basic oxides, controlled maximum amounts of acidic or amphoteric oxides and deoxidizers, and a very carefully controlled maximum and minimum amount of combined fluorine in the form of a fluoride.

11 Claims, No Drawings

CORED TYPE WELDING ELECTRODE

This invention pertains to the art of electric arc welding of steel, and more particularly, to a cored type welding electrode comprised of a tube of steel filled with a fluxing material.

The invention is particularly applicable to a tubular steel welding electrode capable of depositing weld beads with good impact characteristics without the need for exterior gaseous or granular flux arc protection although it will be appreciated that the electrode is also usable with such exteriorly supplied shielding mediums.

In the art of electric arc welding with tubular steel electrodes in air or with an externally supplied shielding gas, it has been conventional in the past to fill the tube with a mixture of fluxing ingredients comprised of substantial amounts of the fluorides of lithium, sodium, calcium, barium and/or aluminum along with oxides, deoxidizers, and sometimes gas producing compounds. Typical of such U.S. Pat. Nos. are those to Landis and Patton: 2,909,778; Haverstraw and Landis: 3,767,891; Gonzalez and Munz: 3,947,655; Carroll and Stump: 3,825,721, and Black: 3,566,073 all owned by the assignee of this application and Dahnier, 3,177,340 and Delong: 3,580,748.

The problems of many prior art tubular electrodes, particularly when high deposition rates are desired, have been a large droplet transfer of metal from the electrode to the weld pool and poor operator appeal. Additionally, electrodes containing large amounts of the fluorides produced large amounts of smoke. Furthermore, as it now appears, such electrodes had a narrow range of voltages over which acceptable weld beads could be obtained.

The present invention contemplates a new and improved formulation for the fill of a tubular or cored steel electrode which overcomes all of the above referred to difficulties and others and provides a welding electrode that produces good penetration, low amounts of smoke, good impact properties, and when welding in air has a much improved voltage range wherein acceptable welds can be obtained.

In accordance with the present invention, instead of using large percentages of fluorides to provide the protection for the arc and the metal transferring to the weld bead, the invention contemplates using larger than normal quantities of certain basic oxides while at the same time limiting the amount of other known fluxing ingredients such as the acid or amphoteric oxides, the fluorides and the deoxidizers.

In accordance with the invention, the basic oxides are selected from the class consisting of the oxides of lithium, barium, clacium, magnesium, potassium, sodium, strontium, cesium and the rare earths in amounts such that the total of these oxides will, at a minimum, be at least 3.6% of the total electrode weight. The upper limit has not been determined but is believed to be on the order of 10%.

The acid or amphoteric oxides are selected from the class consisting of the oxides of titanium, silicon, and zirconium. The total amount of these oxides is limited so as not to exceed 5.0% of the electrode weight since these oxides are reduced in the heat of the arc by the aluminum or magnesium deoxidizers, to be referred to hereinafter, to produce the metal of the oxide which then transfers to the weld pool and results in poor ductility in the weld metal and low notch toughness. In addition, silicon increases the sensitivity to porosity.

The fluorides, if employed, are selected from the fluorides of calcium, barium, lithium, magnesium, potassium, sodium and strontium but the amount of the fluoride selected is so limited that the total amount of fluorine in the fluoride compound is less than 0.5% of the electrode weight. In this respect, it is to be noted that the presence of increasing amounts of fluorine in a cored welding electrode makes the electrode prone to low penetration. However, the use of the basic oxides above discussed, overcomes this effect of the fluorine and a hotter arc is produced which greatly increases the penetration of the arc into the workpiece.

Some fluorine is desirable in order to obtain optimum slag removal and in accordance with one aspect of the invention, sufficient fluorine is present in the mixture such that the fluorine content of the flux is at least 0.1% of the electrode weight but, as indicated, not in excess of 0.5% of the electrode weight. Larger quantities of fluorine in the mixture result in a slag which sticks to the solidified weld bead as well as reducing the penetration.

The fluorine is normally provided in the form of a fluoride of lithium, calcium or barium it being unimportant as to the metal employed so long as the total amount of fluorine in the compound is within the limits specified.

The deoxidizers are selected from the class consisting of aluminum, magnesium (as primary deoxidizers), zirconium, titanium and silicon (as secondary deoxidizers), all either as free metals and/or as an alloy. The primary deoxidizer is aluminum plus in some instances magnesium. Some of this aluminum always transfers to the weld bead as a residual. The percentage of the aluminum which does transfer varies depending upon a number of factors, primarily the amount of oxides present in the fill, (e.g. silicon, iron, or manganese oxide) which will be reduced by the aluminum. Excessive amounts of aluminum tend to deteriorate the notch toughness of the weld deposit. Accordingly, the amount of aluminum is limited such that the residual aluminum in the weld deposit will not exceed 1.10%. In general, the maximum aluminum to result in this residual is 5.0% of the electrode weight. Normally, when welding in air this is insufficient deoxidizer and accordingly, one or more of the other deoxidizers above referred to are employed. Magnesium is an excellent deoxidizer and does not remain as a residual in the weld and may be employed as a primary deoxidizer usually in the form of an alloy with the aluminum, e.g. 45% magnesium and 55% aluminum.

Additionally, secondary deoxidizers (e.g. silicon, titanium or zirconium) may be employed. Some of these metals always transfer to the weld bead as a residual. As indicated, the presence of excessive amounts of these metals in the weld deposit tends to deteriorate the notch toughness and lower the ductility of the weld metal and in accordance with the invention, the amounts of silicon, titanium and zirconium as deoxidizers or as an oxide, are limited to an amount such that the residuals in the weld bead will not exceed 0.40% for silicon, 0.14% for titanium, and 0.14% for zirconium. The percentage of these metals which transfer to the weld bead varies depending on a number of factors e.g. the amount of aluminum in the fill or the presence of other oxides which will be reduced by these metals in alloy or elemental form. In general, it may be stated that the total amount of silicon, titanium, and zirzonium in the fill either in elemental form or an alloy or as a compound of oxygen, must not exceed 2.0% of the electrode weight.

Zirconium, when employed, is preferably used an an alloy of aluminum.

Aluminum is thus supplied both as an alloy and as a pure metal. With the large amounts of aluminum employed, manganese does not function as a deoxidizer. Substantially 100% of any manganese present transfers to the weld bead. Thus manganese, when used, is for alloying purposes.

The basic oxides which are used in accordance with the invention are normally quite hygroscopic and in accordance with the invention, these oxides are employed in the form of a composite containing neutral oxides, e.g. iron oxide and/or manganese oxide, and, in some cases one or more of the other acidic or amphoteric oxides above referred to in sufficient amounts to mask the basic oxide from the moisture in the atmosphere. The formation of a composite is described in the patent to Haverstraw above referred to and will not be described further herein.

In formulating a fluxing mixture, it is necessary that the melting point of the slag be below the solidification temperature of the deposited weld metal. Barium oxide and/or lithium oxide form an eutectic with the other oxides so as to have a low solidification temperature and thus barium oxide and/or lithium oxide are normally always employed in amounts in excess of 0.50%. In this respect, these may be provided in the oxide form per se or as a carbonate. If used as a carbonate, however, the carbonate breaks down in the heat of the arc to evolve carbon dioxide and the evolving of carbon dioxide at the arc tends to cause a sputtering with the loss of operator appeal. For this reason the total amount of combined carbon dioxide in the carbonate must be less than 1.5% of the electrode weight.

The aforementioned fluxing ingredients are normally mixed together very thoroughly in a very finely divided powder form and are then poured into a U-shaped strip of mild steel in an amount, considering the dimensions of the strip, to provide the desired percentage of fill. Thereafter, the edges of the U-shaped strip are closed and the tube thus formed with the fluxing materials on the inside is then drawn down to the final desired exterior diameter.

In general in accordance with the invention, the improved fill for a mild steel tube by weight percent of the total Electrode is as follows:

| basic oxide(s) | 3.6%–10% |
| acidic or amphoteric oxide(s) | 0.0%–5.0% |
| primary deoxidizer(s) | 3.5%–5.5% |
| secondary deoxidizer(s) | 0.1%–2.0% |
| combined fluorine | 0.1%–0.5% |
| neutral oxides | 0%–12% |
| manganese | As needed to match workpiece manganese |

Within these ranges typical flux formulations are as follows:

TABLE I

| CHEMICAL | A | B | C | D | E |
| --- | --- | --- | --- | --- | --- |
| (aluminum powder) | 15.4% | 15.9% | 14.5% | 11.9% | 15.7% |
| (manganese metal) | 3.1 | 3.1 | 4.1 | 3.0 | — |
| (12% lithium oxide, 13% calcium oxide, 60% manganese oxide, 15% silicon dioxide) | — | — | — | — | 16.0% |
| (40% grade ferrotitanium) | 2.5 | 2.5 | 2.2 | — | — |
| (18% lithium oxide, 82% iron oxide) | 24.4 | 22.4 | 22.4 | — | 6.9 |
| (40-50% barium oxide, 50-60% iron oxide) | 37.7 | 39.2 | 29.4 | 28.6 | 32.4 |
| (12% lithium oxide, 13% calcium oxide, 60% iron oxide, 15% SiO$_2$) | — | — | 10.0 | 33.8 | 7.4 |
| (56% zirconium, 44% aluminum alloy) | 5.9 | 5.9 | 5.0 | 3.5 | 2.9 |
| (barium fluoride) | 7.0 | 7.0 | 7.0 | 7.1 | 4.0 |
| (magnesium oxide) | 4.0 | 4.0 | 2.9 | — | — |
| (45% magnesium, 55% aluminum alloy) | — | — | 2.5 | 8.2 | 8.1 |
| (28% Li$_2$O, 72% TiO$_2$) | — | — | — | — | 4.8% |
| (rutile) | — | — | — | 3.4% | — |
| (iron powder) | — | — | — | 0.5% | — |
| (calcium fluoride) | — | — | — | — | 1.8 |
| | 100.0% | 100.0% | 100.0% | 100.0% | 100.0% |
| Fill Range (flux to total electrode weight) | 22/25% | 22/25% | 22/25% | 20/22.5% | 17/ 19.5% |

The above flux formulations at the average of the fill range for each of the typical formulations provide ingredients as follows wherein the weights are given as a percent of the total electrode weight.

TABLE II

| CHEMICAL | A | B | C | D | E |
|---|---|---|---|---|---|
| Al | 4.23% | 4.35% | 4.25% | 3.81% | 3.91% |
| Mg | — | — | 0.26% | 0.78% | 0.67% |
| Mn | 0.73% | 0.73% | 0.96% | 0.64% | — |
| Ti | 0.24% | 0.24% | 0.21% | — | — |
| Zr | 0.78% | 0.78% | 0.66% | 0.42% | 0.30% |
| Fe | 0.35% | 0.35% | 0.31% | 0.11% | — |
| Mg O | 0.94% | 0.94% | 0.68% | — | 0.38% |
| Ca O | — | — | 0.31% | 0.93% | 0.176% |
| $Li_2O$ | 1.03% | 0.95% | 1.23% | 0.86% | 0.98% |
| Ba O | 3.99% | 4.15% | 3.11% | 2.74% | 2.66% |
| $Fe_xO_y$ | 9.58% | 9.38% | 9.53% | 7.65% | 5.10% |
| $Mn_xO_y$ | — | — | — | — | 1.75% |
| $Si O_2$ | — | — | 0.35% | 1.08% | 0.641% |
| $Ti O_2$ | — | — | — | 0.72% | 0.631% |
| $Ba F_2$ | 1.65% | 1.65% | 1.65% | 1.51% | 0.73% |
| $Ca F_2$ | — | — | — | — | 0.33% |

Typical welding conditions using the electrode of the present invention are as follows:

TABLE III

PROCEDURE RANGE:
DC(+) Polarity, 3/4 to 1" Electrical Stick-Out

| WIRE SIZE | WIRE FEED SPEED in/min | CURRENT (amps) | ARC VOLTS |
|---|---|---|---|
| 5/64" | 160–300 | 255–420 | 21–27 |
| 3/32" | 150–250 | 375–530 | 20–28 |

Using the electrode of the present invention, it has been possible to obtain the following test results:

TABLE IV

| AS WELDED | TENSILE STRENGTH psi | YIELD STRENGTH psi | ELONG- ATION % in 2" | CHARPY V-NOTCH at −20° F. |
|---|---|---|---|---|
| 5/64" | 72–80,000 | 60–66,000 | 22–28 | 20–37 |
| 3/32" | 72–86,000 | 60–72,000 | 22–28 | 20–39 |

Where weld metal properties or residuals are stated, these are of all weld metal deposits (i.e. a multi-pass deposit) with little or no dilution from the workpiece metal.

The important factor of the invention is to use, as the principal fluxing or shielding ingredient, in excess of 3.6% basic oxides in combination with other conventional ingredients usually found in cored type welding electrodes but in amounts such as not to be detrimental to the slag or weld deposit physical characteristics. In this respect, aluminum in the weld deposit in amounts in excess of 1.10% is detrimental. Silicon in excess of 0.40% is detrimental. Zirconium or titanium individually in amounts in excess of 0.14% each is detrimental. Accordingly, the amounts of these elements present in the tube either as a free metal or (as to the latter three) in a compound must be limited so that considering the efficiency of transfer to the weld deposit, the weld deposit residuals are below the stated amounts.

Any fluoride in the tube always appears in the slag. Too much or too little makes the slag stick. With the right amount, the slag lifts off. The range of combined fluorine considered necessary is 0.1–0.5%. This is much lower than heretofore. Because of the reduced level of fluorides and the use of high levels of oxides which are normally higher boiling, the amount of smoke is reduced.

The basic oxides may be used in limited quantities in the carbonate form or "as is", i.e. in the oxide form. If used in the oxide form, because of their hygroscopic tendency, they are preferably combined with one or more of the neutral oxides as a "composite". A composite, of course, may be defined as an intimate mixture of stated ingredients which have been heated to a high enough temperature such that the increased randomness in state permits at least one of the ingredients to react with the other ingredients such that to all intents and purposes, at least part of the ingredients are a compound of two or more of the ingredients. These mixtures may also be heated to a temperature at which complete fusion occurs.

The invention has been described with reference to preferred embodiments. Obviously modifications and alterations in the formulations given will occur to others upon a reading and understanding of this specification and it is our intention to include all such modifications and alterations insofar as they come within the scope of the appended claims.

Having thus described the invention, it is claimed:

1. A cored type welding electrode comprised of a tube of mild steel having on the inside thereof a fill consisting of the following ingredients in weight percent of the total electrode weight: one or more basic oxides selected from the class consisting of lithium, barium, calcium, magnesium, strontium, cesium and the rare earth metals in amounts of from 3.6% to 10%; one or more acidic oxides selected from the class consisting of zirconium, titanium and silicon oxides in amounts of 0.0% to 5.0%; one or more deoxidizers selected from the class consisting of aluminum, magnesium, silicon, zirconium, and titanium, provided that the total amount of which selected deoxidizer is such that the residual thereof in the deposited weld metal will not exceed 1.10% for aluminum, 0.14% for zirconium, 0.14% for titanium and 0.40% for silicon, assuming no dilution from the piece being welded; and, one or more fluorides selected from the class consisting of the fluorides of calcium, barium, lithium, magnesium, potassium, sodium, strontium, cesium and the rare earth metals in amounts wherein the total combined fluorine does not exceed 0.5%.

2. In a cored type welding electrode comprised of a tube of mild steel having on the inside thereof as major ingredients: one or more basic oxides selected from the class consisting of the oxides of lithium, barium, calcium, magnesium, strontium, cesium and the rare earths; one or more acidic or amphoteric oxides selected from the class consisting of the oxides of zirconium, titanium and silicon; one or more neutral oxides selected from the class consisting of manganese oxide and iron oxide; one or more primary deoxidizers selected from the class consisting of aluminum and magnesium; one or more secondary deoxidizers selected from the class consisting of silicon, zirconium and titanium; the improvement which comprises: and ingredients being comprised of the following elements or compounds in percent weight of the total electrode weight:

| | |
|---|---|
| basic oxide(s) | 3.6%–10% |
| neutral oxide(s) | 0.0%–12.0% |
| combined fluorine | 0.1%–0.5% |
| acidic or amphoteric oxide(s) | 0.0%–5.0% |
| primary deoxidizer(s) | 3.5%–5.5% |

| | |
|---|---|
| secondary deoxidizer(s) | 0.10%–2.0% |
| manganese | As needed to match workpiece manganese | provided that the total amount of deoxidizer(s) and the total amount of acidic or amphoteric oxides, is such that the residual thereof in the weld bead will not exceed: 1.10% for aluminum; 0.14% for zirconium; 0.14% for titanium; and, 0.40% for silicon, assuming no dilution from the workpiece being welded.

3. The improvement of claim 2 wherein the combined fluorine is from a class consisting of the fluorides of clacium, barium, lithium, magnesium, potassium, sodium, strontium, cesium and the rare earth metals and the basic oxides are selected from the class consisting of the oxides of lithium, barium, calcium, magnesium, strontium, cesium, and the rare earth metals.

4. The improvement of claim 2 wherein at least one of the basic oxides is in the form of a composite with said neutral, acidic or amphoteric oxide.

5. The improvement of claim 2 wherein the basic oxides include lithium oxide in an amount at least in excess of 0.50% and the maximum total silicon, titanium, and zirconium, either as a free metal, an alloy, or in a compound is not in excess of 2.0%.

6. The improvement of claim 2 wherein at least one of the basic oxides is in the form of a carbonate but the total combined carbon dioxide in the carbonate does not exceed 1.5%.

7. In a cored type welding electrode comprised of a tube of mild steel having a fill on the inside, the improvement which comprises: the fill being comprised of the following ingredients in approximately the weights indicated expressed as a percent of the total electrode weight:

Al—4.23%
Mn—0.73%
Ti—0.24%
Zr—0.78%
Fe—0.35%
Mg O—0.94%
Li$_2$O—1.03%
Ba O—3.99%
Fe$_x$O$_y$—9.58%
Ba F$_2$—1.6%

8. In a cored type welding electrode comprised of a tube of mild steel having a fill on the inside, the improvement which comprises of the fill being comprised of the following ingredients in approximately the weight indicated expressed as a percent of the total electrode weight:

Al—4.35%
Mn—0.73%
Ti—0.24%
Zr—0.78%
Fe—0.35%
Mg O—0.94%
Li$_2$O—0.95%
Ba O—4.15%
Fe$_x$O$_y$—9.38%
Ba F$_2$—1.65%

9. In a cored type welding electrode comprised of a tube of mild steel having a fill on the inside, the improvement which comprises: the fill being comprised of the following ingredients in approximately the weight indicated expressed as a percent of the total electrode weight:

Al—4.25%
Mg—0.26%
Mn—0.96%
Ti—0.21%
Zr—0.66%
Fe—0.31%
Mg O—0.68%
Ca O—0.31%
Li$_2$O—1.23%
Ba O—3.11%
Fe$_x$O$_y$—9.53%
Si O$_2$—0.35%
Ba F$_2$—1.65%

10. In a cured type welding electrode comprised of a tube of mild steel having a fill on the inside, the improvement which comprises: the fill being comprised of the following ingredients in approximately the weight indicated expressed as a percent of the total electrode weight:

Al—3.81%
Mg—0.78%
Mn—0.64%
Zr—0.42%
Fe—0.11%
Ca O—0.93%
Li$_2$ O—0.86%
Ba O—2.74%
Fe$_x$ O$_y$—7.65%
Si O$_2$—1.08%
Ti O$_2$—0.72%
Ba F$_2$—1.51%

11. In a cored type welding electrode comprised of a tube of mild steel having a fill on the inside, the improvement which comprises: the fill being comprised of the following ingredients in approximately the weight indicated expressed as a percent of the total electrode weight:

Al—3.91%
Mg—0.67%
Zr—0.30%
Mg O—0.38%
Ca O—0.176%
Li$_2$ O—0.98%
Ba O—2.66%
Fe$_x$ O$_y$—5.10%
Mn$_x$ O$_y$—1.75%
Si O$_2$—0.641%
Ti O$_2$—0.631%
Ba F$_2$—0.73%
Ca F$_2$—0.33%

* * * * *

UNITED STATES PATENT AND TRADEMARK OFFICE
CERTIFICATE OF CORRECTION

PATENT NO. : 4,186,293
DATED : January 29, 1980
INVENTOR(S) : John Gonzalez, Roland F. Young, Mario A. Amata It is certified that error appears in the above-identified patent and that said Letters Patent are hereby corrected as shown below:

Column 4, line 17, "Electrode" should read -- electrode --.

Claim 2, column 6, line 58, after "comprises:" the word "and" should read -- said --.

Claim 10, column 8, line 23, "cured" should read -- cored --.

Signed and Sealed this

Twenty-fourth Day of June 1980

[SEAL]

Attest:

SIDNEY A. DIAMOND

Attesting Officer

Commissioner of Patents and Trademarks